(12) United States Patent
Tamai et al.

(10) Patent No.: US 9,453,572 B2
(45) Date of Patent: Sep. 27, 2016

(54) ELECTRO-MECHANICAL DRIVE SYSTEM

(71) Applicant: GM GLOBAL TECHNOLOGY OPERATIONS LLC, Detroit, MI (US)

(72) Inventors: Goro Tamai, Bloomfield Hills, MI (US); Shawn H. Swales, Canton, MI (US); Norman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 14/254,508

(22) Filed: Apr. 16, 2014

(65) Prior Publication Data

US 2015/0300461 A1 Oct. 22, 2015

(51) Int. Cl.
*F16H 3/72* (2006.01)
*F16H 57/021* (2012.01)
*F16H 57/04* (2010.01)
*B60K 6/365* (2007.10)
*B60K 6/40* (2007.10)
*B60K 6/445* (2007.10)

(52) U.S. Cl.
CPC ............ *F16H 57/021* (2013.01); *B60K 6/365* (2013.01); *B60K 6/40* (2013.01); *B60K 6/445* (2013.01); *F16H 3/727* (2013.01); *F16H 57/0482* (2013.01); *F16H 2200/2007* (2013.01); *Y02T 10/6239* (2013.01); *Y10S 903/917* (2013.01)

(58) Field of Classification Search
None
See application file for complete search history.

(56) References Cited

U.S. PATENT DOCUMENTS

| 2006/0201725 | A1* | 9/2006 | Kano et al. ............ B60K 6/365 180/65.235 |
| 2012/0329594 | A1* | 12/2012 | Sada et al. ............... B60K 6/40 475/5 |
| 2013/0116076 | A1 | 5/2013 | Tamai et al. |
| 2015/0031488 | A1* | 1/2015 | Okuda et al. .......... B60K 6/365 475/5 |

FOREIGN PATENT DOCUMENTS

WO   WO 2013/114631 A1 *  8/2013

\* cited by examiner

*Primary Examiner* — Erin D Bishop
(74) *Attorney, Agent, or Firm* — Quinn Law Group, PLLC

(57) ABSTRACT

An electro mechanical-drive system includes a main shaft, a plurality of ball bearings disposed around the main shaft, and a plurality of roller bearing disposed around the main shaft. At least one of the ball bearings is aligned with at least one of the roller bearings along an axis perpendicular to the main shaft. The ball and roller bearings may support other components of the electro-mechanical drive system and may be arranged in a nested or staggered configuration.

17 Claims, 2 Drawing Sheets

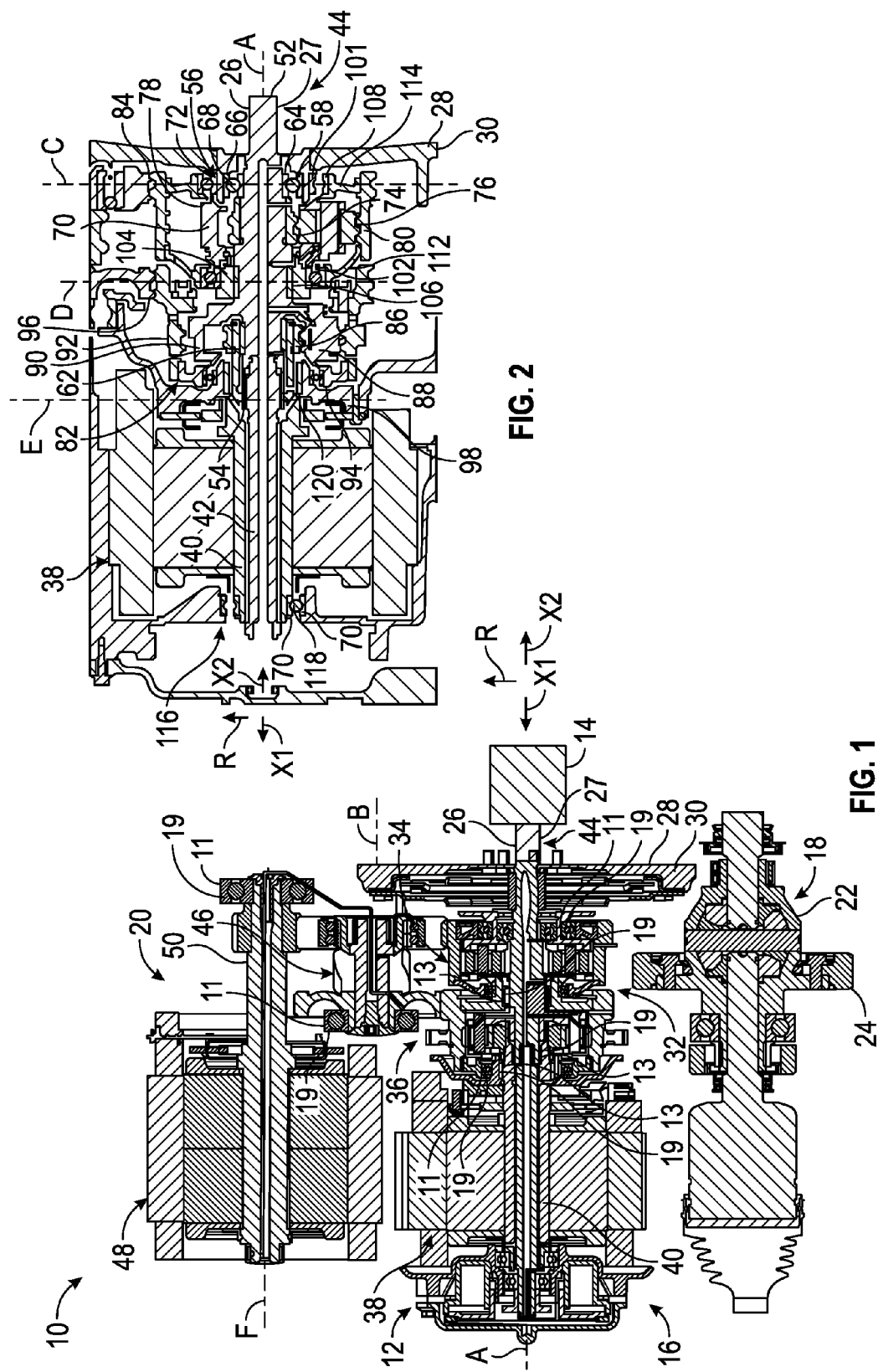

ELECTRO-MECHANICAL DRIVE SYSTEM

TECHNICAL FIELD

The present disclosure relates to an electro-mechanical drive system.

BACKGROUND

Electro-mechanical drive systems may be part of a hybrid powertrain and includes at least one electric motor-generator capable of converting electrical energy into kinetic energy. In addition, the electro-mechanical drive system can receive power from an internal combustion engine. The internal combustion engine combusts fuel to generate torque.

SUMMARY

It is useful to minimize the mechanical losses in an electro-mechanical drive system in order to minimize fuel consumption of the hybrid powertrain. It is also useful to minimize the space occupied by the electro-mechanical drive system. To do so, the bearings in the electro-mechanical drive system may be arranged as described in the present disclosure. In an embodiment, the electro-mechanical drive system includes a stationary member, an input member extending along a first axis, and a compound planetary gear arrangement operatively coupled to the input member. Torque can be transmitted from the input member to the compound planetary gear arrangement. The electro-mechanical drive system further includes first and second electric motor-generators operatively coupled to the compound planetary gear arrangement. Torque can be transmitted between the first electric motor-generator and the compound planetary gear arrangement. Moreover, torque can be transmitted between the first electric motor-generator and the compound planetary gear arrangement. The electro-mechanical drive system additionally includes a transfer gear set extending along a second axis. The transfer gear set is operatively coupled between the second motor-generator and the compound planetary gear arrangement. Accordingly, torque can be transmitted between the second motor-generator and the compound planetary gear arrangement through the transfer gear set. In addition, the electro-mechanical drive system includes a plurality of bearings. For instance, the electro-mechanical drive system includes at least one ball bearing and at least one roller bearing. The ball bearing supports the input member and is fixed to the stationary member such that the ball bearing remains constrained relative to the stationary member. The roller bearing supports the input member. At least two of the bearings are aligned with each other along a third axis. The third axis is perpendicular to the first axis. In another embodiment, at least two of the ball bearings are aligned along an axis perpendicular to the input member, which may be a main shaft. In another example, at least one of the ball bearings is aligned with at least one of the roller bearings along an axis perpendicular to the input member (e.g., main shaft).

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, side, sectional view of a hybrid powertrain of a vehicle, wherein the hybrid powertrain includes an electro-mechanical drive system;

FIG. 2 is a schematic, side, sectional view of part of the electro-mechanical drive system;

DETAILED DESCRIPTION

Figure 3:
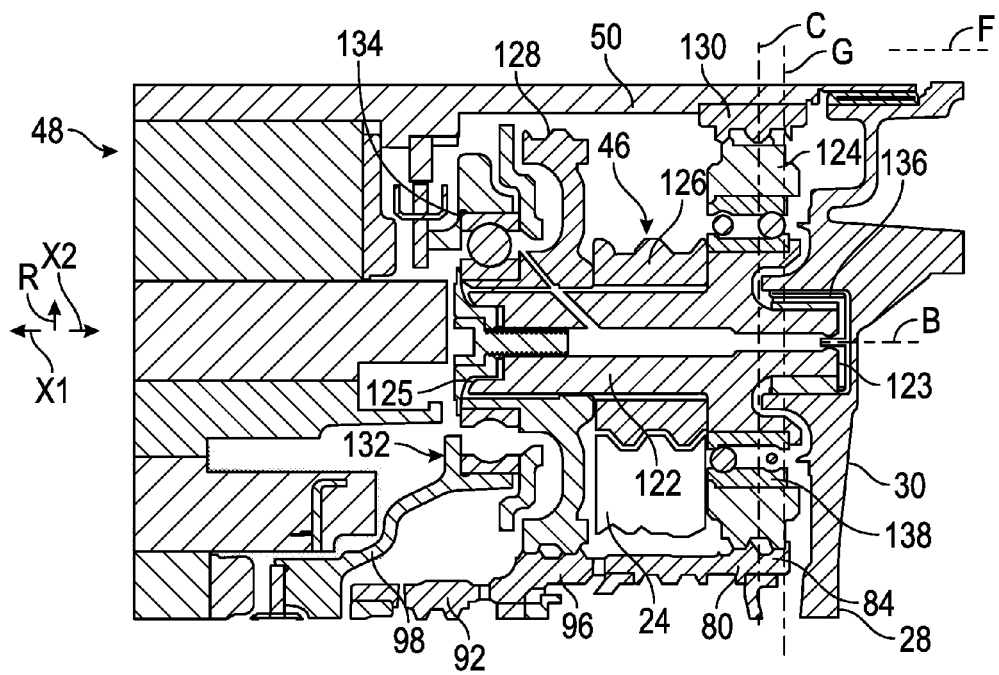
FIG. 3 is a schematic, side, sectional view of another part of the electro-mechanical drive system shown in FIG. 2.

Referring to the drawings in which like elements are identified with identical numerals throughout, FIG. 1 schematically illustrates a hybrid powertrain 12 of a vehicle 10. In other words, the vehicle 10 includes the hybrid powertrain 12, which is capable of propelling the vehicle 10. The hybrid powertrain 12 includes an internal combustion engine 14 and an electro-mechanical drive system 16 operatively coupled to the internal combustion engine 14. Accordingly, the internal combustion engine 14 can transmit torque to the electro-mechanical drive system 16. The electro-mechanical drive system 16 includes a final drive unit 18 and an electrically variable transmission (EVT) 20 operatively coupled to the final drive unit 18. As such, the final drive unit 18 can receive torque from the EVT 20. The final drive unit 18 includes a differential 22, which in turn has a differential ring gear 24 operatively coupled to the EVT 20. As a result, the EVT 20 can transmit torque to the differential ring gear 24 of the differential 22.

With reference to FIG. 1, the EVT 20 includes an input member 26, such as a main shaft 27, operatively coupled to the internal combustion engine 14. Consequently, the internal combustion engine 14 can transmit torque to the input member 26. In other words, the internal combustion engine 14 can transmit torque to the EVT 20 via the input member 26. The input member 26 extends along a first axis A. The input member 26 may have a substantially cylindrical shape and can rotate about the first axis A upon receipt of torque from the internal combustion engine 16.

The EVT 20 further includes a stationary member 28 at least partially encasing the input member 26. As a non-limiting example, the stationary member 28 may be configured as a case 30 or housing. Regardless of its configuration, the stationary member 28 remains stationary while the input member 26 rotates about the first axis A. To this end, the stationary member 28 may be fixed to the vehicle body of the vehicle 10. Accordingly, the stationary member 28 (e.g., case 30) remains constrained or substantially stationary relative to the vehicle body of the vehicle 10.

The EVT 20 additionally includes a compound planetary gear arrangement 32 operatively coupled to the input member 26. Accordingly, torque can be transmitted from the input member 26 to the compound planetary gear arrangement 32. The compound planetary gear arrangement 32 includes a first planetary gear set 34 and a second planetary gear set 36. The first planetary gear set 34 is operatively coupled to the input member 26. Consequently, torque can be transmitted from the input member 26 to the first planetary gear set 34. The second planetary gear set 36 is operatively coupled to the first planetary gear set 34. As a result, torque can be transmitted from the first planetary gear set 34 to the second planetary gear set 36.

The electro-mechanical drive system 16 further includes a first electric motor-generator 38 is operatively coupled to the compound planetary gear arrangement 32. Accordingly, torque can be transmitted between the first electric motor-generator 38 and the compound planetary gear arrangement 32. Specifically, the first electric motor-generator 38 is operatively coupled to the second planetary gear set 36. Because the first electric motor-generator 38 is operatively coupled to the second planetary gear set 36, torque can be transmitted from the first electric motor-generator 38 to the second planetary gear set 36 (or another component of the EVT 20). The first electric motor-generator 38 is electrically connected to an energy storage device, such as a battery pack, and can operate in motoring mode and generating mode. In the motoring mode, the first electric motor-generator 38 can convert electrical energy received from the energy storage device into mechanical energy (e.g., torque). Conversely, when operating in the generating mode, the first electric motor-generator 38 coverts mechanical energy (e.g., torque) into electrical energy. The electrical energy generated by the electric motor-generator 38 can then be transmitted to the energy storage device. The first electric motor-generator 38 includes a first rotor shaft 40 extending along the first axis A. The electro-mechanical drive system 16 further includes an input extension member 42 (FIG. 2) extending through the first rotor shaft 40 along the first axis A. The input extension member 42 (FIG. 2) is operatively coupled to the input member 26 and can therefore rotate about the first axis A simultaneously with the input member 26. In other words, the input extension member 42 can rotate about the first axis A upon receipt of the torque from the input member 26. The input member 26 and the input extension member 42 (FIG. 2) may be collectively referred to as an input member assembly 44.

The EVT 20 also includes a transfer gear set 46 capable of receiving torque from the input member 26 through the compound planetary gear arrangement 32. Specifically, the transfer gear set 46 is operatively coupled to the second planetary gear set 36. Accordingly, torque can be transmitted from the second planetary gear set 36 to the transfer gear set 46. In the depicted embodiment, the transfer gear set 46 is a coaxial transfer gear set 46 and extends along a second axis B. The second axis B is offset relative to the first axis A. As a non-limiting example, the second axis B is parallel to the first axis A. In the depicted embodiment, the second axis B is spaced apart from the first axis along a radial direction R.

The electro-mechanical drive system 16 further includes a second electric motor-generator 48 operatively coupled to the transfer gear set 46. As a consequence, the toque can be transmitted from the second electric motor-generator 48 to the transfer gear set 46. The transfer gear set 46 is also operatively coupled to the first planetary gear set 34. Accordingly, torque can be transmitted from the transfer gear set 46 to the first planetary gear set 36. In particular, torque can be transmitted from the second electric motor-generator 48 to the first planetary gear set 34 through the transfer gear set 46. The second electric motor-generator 48 includes a second rotor shaft 50 operatively coupled to the transfer gear set 46. As a result, torque can be transmitted from the second rotor shaft 50 to the transfer gear set 46. The transfer gear set 46 is also operatively coupled to the final drive unit 18. Thus, torque can be transmitted from the transfer gear set 46 to the final drive unit 18. In particular, the transfer gear set 46 is operatively coupled to the differential 22. In the depicted embodiment, the transfer gear set 46 is operatively coupled to the differential ring gear 24 of the differential 22. Accordingly, torque can be transmitted from the transfer gear set 46 to the differential 22 via the differential ring gear 24. The second electric motor-generator 48 is operatively coupled to the compound planetary gear arrangement 32 through the transfer gear set 46. In other words, the transfer gear set 46 is operatively coupled between the second electric motor-generator 48. As such, torque can be transmitted between the second electric motor-generator 48 and the compound planetary gear arrangement 32 through the transfer gear set 46.

The electro-mechanical drive system 16 includes a plurality of bearings 19. In particular, the electro-mechanical drive system 16 includes a plurality of ball bearings 11, such as deep groove ball bearings, and a plurality of roller bearings 13, such as needle roller bearings, as discussed in detail below. Each roller bearing 13 includes a plurality of rollers along its circumference. At least some of the ball bearings 11 are disposed around the input member 26 (e.g., main shaft 27). At least some of the roller bearings 13 are disposed around the input member 26 (e.g., main shaft 27). As discussed in detail below, at least two bearings 19 are aligned with each other along an axis (see, e.g. axes C, D, and E in FIG. 2) that is perpendicular (or substantially perpendicular) to the first axis A. For example, at least one of the ball bearings 11 may be aligned with at least one of the roller bearings 13 along an axis (see, e.g. axes C, D, and E in FIG. 2) that is perpendicular to the input member 26 (e.g. main shaft 27). Also, at least two ball bearings 11 are aligned with each other along an axis (see, e.g. axes C, D, and E in FIG. 2) that is perpendicular (or substantially perpendicular) to the first axis A and the input member 26 (e.g., main shaft 27).

With reference to FIG. 2, the input member 26 defines a first input end 52 and a second input end 54 opposite the first input end 52. The first input end 52 is directly coupled to the internal combustion engine 14 (FIG. 1), and the second input end 54 is directly coupled to the input extension member 42. The second input end 54 is spaced apart from the first input end 54 along a first axial direction X1. The first axial direction X1 is perpendicular to the radial direction R. In the present disclosure, a second axial direction X2 is defined as the direction opposite to the first direction X1. The first rotor shaft 40 is at least partially disposed over the input extension member 42 and input member 26.

As discussed above, the EVT 20 includes the first and second planetary gear sets 34, 36. In the depicted embodiment, the first planetary gear set 34 includes a first sun gear 74 and a plurality of first planet gears 76 disposed around the first sun gear 74. The first sun gear 74 is disposed around the input member 26. Specifically, the first sun gear 74 is operatively coupled to the input member 26 and, accordingly, torque can be transmitted from the input member 26 to the first sun gear 74. Upon receipt of torque from the input member 26, the first sun gear 74 rotates about the first axis A. Further, the first sun gear 74 continuously meshes with the first planet gears 76. As a result, the rotation of the first sun gear 74 causes the first planet gears 76 to rotate around the first sun gear 74. The first planetary gear set 34 further includes a first carrier 78 coupling all the first planet gears 76 to one another. In addition to the first carrier 78, the first planetary gear set 34 includes a first internal ring gear 80 continuously meshing with the first planet gears 76. Consequently, the rotation of the first plant gears 76 about the first axis A causes the first internal ring gear 80 to rotate about the first axis A. The first planetary gear set 34 further includes a first external ring gear 84 connected to the first internal ring gear 80. Accordingly, the rotation of the first internal ring gear 80 about the first axis A causes the first external ring gear 84 to rotate about the first axis A. The first internal ring gear 80 may be integrally formed with the first external ring gear 84 so as to form a one-piece structure. The first external ring gear 84 is operatively coupled to the transfer gear set 46 such that torque can be transmitted between the transfer gear set 46 and the first external ring gear 84.

The second planetary gear set 36 includes a second sun gear 86 and a plurality of second planet gears 88 disposed around the second sun gear 86. The second sun gear 86 is disposed around the first rotor shaft 40. Specifically, the second sun gear 86 is operatively coupled to the first rotor shaft 40 and, accordingly, torque can be transmitted from the first rotor shaft 40 to the second sun gear 86. Upon receipt of torque from the first rotor shaft 40, the second sun gear 86 rotates about the first axis A. Further, the second sun gear 86 continuously meshes with the second planet gears 88. As a result, the rotation of the second sun gear 86 about the first axis A causes the second planet gears 88 to rotate around the second sun gear 86. The second planetary gear set 36 further includes a second carrier 90 coupling all the second planet gears 88 to one another. In addition to the second carrier 90, the second planetary gear set 36 includes a second internal ring gear 92 continuously meshing with the second planet gears 88. Consequently, the rotation of the second plant gears 88 about the first axis A causes the second internal ring gear 92 to rotate about the first axis A. The second planetary gear set 36 further includes a second external ring gear 96 connected to the first internal ring gear 92. Accordingly, the rotation of the second internal ring gear 92 about the first axis A causes the second external ring gear 96 to rotate about the first axis A. The first internal ring gear 92 may be integrally formed with the second external ring gear 96 to form a one-piece structure. The second external ring gear 96 is operatively coupled to the transfer gear set 46 such that torque can be transmitted between the transfer gear set 46 and the second external ring gear 96.

The EVT 20 includes a first fixed, free bearing arrangement 56 for supporting axial and radial loads on the input member 26. As used herein, the term "fixed, free bearing arrangement" refers to a group of bearing coupled a component of the EVT 20, such as the input member 26, in order to support axial and radial loads acting on the that component (e.g., input member 26). Specifically, the term "fixed, free bearing arrangement" refers to a plurality of bearings, wherein one or more bearings support the axial and radial loads acting on a component (e.g., input member 26) and another bearing (or group of bearings) only support the radial loads acting on that component. In other words, in a fixed, free bearing arrangement, at least one bearing 19 (or group of bearings 19) is constrained or substantially stationary along the radial direction R as well as the first and second axial directions X1, X2, and at least one other bearing 19 (or group of bearings) is constrained or substantially stationary along the radial direction R but is free to move along the first and second axial directions X1, X2. A fixed, free bearing arrangement including only two bearings may be referred to as a fixed, free bearing pair. The fixed, free bearing arrangements in the EVT 20 help minimize mechanical losses by minimizing the effective bearing mean diameters of the bearings.

The first fixed, free bearing arrangement 56 includes a first ball bearing 58, such as a deep groove ball bearing, supporting the input member 26 and a first roller bearing 62, such as a needle roller bearing, supporting the input member 26. The first ball bearing 58 and the first roller bearing 62 are part of the plurality of bearings 19 (FIG. 1). In the depicted embodiment, each ball bearing 11, such as the first ball bearing 58, includes an inner race 64, outer race 66, and a plurality of balls 68. The inner and outer races 64, 66 have a substantially annular shape and are spaced apart from each other so as to define an annular groove, which is configured, shaped, and sized to receive the balls 68. The first ball bearing 58 is disposed around the input member 26 and is therefore coaxially arranged relative to the input member 26. The first ball bearing 58 is fixed to the stationary member 28 (e.g., case 30) along the radial direction R and the axial direction (e.g., the first axial direction X1, the second axial direction X2, or both). In the depicted embodiment, the first ball bearing 58 is fixed to the stationary member 28 along the radial direction R, the first axial direction X1, and the second axial direction X2. Thus, the first ball bearing 58 remains constrained or substantially stationary relative to the stationary member 28 along the radial direction R, the first axial direction X1, and the second axial direction X2. A snap ring 70 may be coupled to the stationary member 28 in order to fix the first ball bearing 58 along the first axial direction X1. A flange 72 of the stationary member 28 abuts the first ball bearing 58 in order to fix the first ball bearing 58 along the second axial direction X2. The first ball bearing 58 is closer to the first input end 52 than the first roller bearing 62.

As discussed above, the first fixed, free bearing arrangement 56 also includes the first roller bearing 62, such as a needle roller bearing, supporting the input member 26. Each roller bearing 13, such as the first roller bearing 62, includes an annular body and roller disposed along the circumference of the annular body. Specifically, the first roller bearing 62 contacts the input member 26 and the first rotor shaft 40 and only supports radial loads acting on the input member 26 (or any member of the EVT 20 supported by the first roller bearing 62. Accordingly, the first roller bearing 62 does not support axial loads acting on the input member 26. Accordingly, the first roller bearing 62 is axially free. In the depicted embodiment, the first roller bearing 62 is disposed around the input member 26 and is arranged coaxially relative to the input member 26. Specifically, the first roller bearing 62 contacts the input member 26 and is disposed between the input member 26 and the first rotor shaft 40. The first roller bearing 62 is closer to the second input end 54 than the first ball bearing 58. Moreover, the first roller bearing 62 is spaced apart from the first ball bearing 58 along the first axial direction X1. Further, the first roller bearing 62 can remain constrained or substantially stationary relative to the stationary member 28 along the radial direction R.

As discussed above, the first fixed, free bearing arrangement 56 supports axial and radial loads acting on the input member 26 (or any member of the EVT 20 supported by the first fixed, free bearing arrangement 56). In the present disclosure, the term "axial load" refers to forces acting on a component of the EVT 20, such as the input member 26, in the first axial direction X1 or the second axial direction X2. The term "radial load" refers to forces acting on a component of the EVT 20, such as the input member 26, in the radial direction R. In addition, the term "radial load" may include forces acting on a component of the EVT 20 (e.g., input member 26) along a direction obliquely angled to the first axial direction X1 and the second axial direction X2.

The EVT 20 includes a second fixed, free bearing arrangement 82 supporting the first internal ring gear 80, the first external ring gear 84, the second internal ring gear 92, and the second external ring gear 96. In the depicted embodiment, the second fixed, free bearing arrangement 82 includes a second ball bearing 94 fixed to the stationary member 28 along the first axial direction X1. Consequently, the second ball bearing 94 remains constrained or substantially stationary relative to the stationary member 28 along the first axial direction X1. The second ball bearing 94 is disposed around the input member 26. In particular, a center support 98 of the stationary member 28 can contact the second ball bearing 94 in order to prevent the second ball bearing 94 from moving in the first axial direction X1. However, the center support 98 does not restrict the movement of the second ball bearing 94 in the second axial direction X2.

The second fixed, free bearing arrangement 82 also includes a third ball bearing 102 disposed around the input member 26. The EVT 20 includes a hub 104 supporting the third ball bearing 102. The hub 104 is disposed entirely within the stationary member 28 and interconnects the second internal ring gear 92 and the first carrier 78. Because the second internal ring gear 92 is directly connected to the second external ring gear 96, the hub 104 interconnects the second external ring gear 96 with the first carrier 78. Moreover, the hub 104 is coaxially arranged relative to the input member 26 and is disposed between a second roller bearing 106 and the third ball bearing 102. When the input member 26 is subjected to a force in the first axial direction X, the force is transferred from the third ball bearing 102 to the second ball bearing 94 via the hub 104 and the second internal ring gear 92. Because the second ball bearing 94 is fixed to the stationary member 28 along the first axial direction X1, the third ball bearing 102 is fixed to the stationary member 28 along the axial direction X1 via the second ball bearing 94. Accordingly, the third ball bearing 102 can support axial loads acting on the input member 26 (or any member of the EVT 20 supported by the third ball bearing 102) in the first axial direction X1. In other words, the third ball bearing 102 is operatively coupled to the second ball bearing 94 such that an axial load on the input member 26 in the first axial direction X1 can be transferred from the third ball bearing 104 to the second ball bearing 94. In addition to axial loads, the third ball bearing 102 can support radial loads acting on the input member 26 (or any member of the EVT 20 supported by the third ball bearing 102). Furthermore, the third ball bearing 102 is disposed between the hub 104 and a web 112 supporting the first internal ring gear 80. The third ball bearing 102 is therefore operatively coupled between the first internal ring gear 80 and the second internal ring gear 92.

The second fixed, free bearing arrangement 82 further includes fourth ball bearing 108 fixed to the stationary member 28 in the second axial direction X2 such that the fourth bearing 108 remains constrained or substantially stationary relative to the stationary member 28 along the second axial direction X2. The fourth ball bearing 108 is disposed around the input member 26. The stationary member 28 includes a cover 110 contacting and supporting the fourth ball bearing 108 in order to fix the fourth ball bearing 108 to the stationary member 28 in the second axial direction X2 and the radial direction R. The cover 100 may include a cover flange 101 for supporting the fourth ball bearing 108 in the radial direction R. Thus, the fourth ball bearing 108 is fixed to the stationary member 28 along the second axial direction X and the radial direction R such that the fourth ball bearing 108 remains constrained or substantially stationary relative to the stationary member 28 along the second axial direction X2 and the radial direction R. The fourth ball bearing 108 is disposed around the input member 26 and adjacent the first carrier 78. The EVT 20 includes a ring support 114 supporting the first external ring gear 84. The fourth ball bearing 108 is disposed between the cover flange 101 and the ring support 114. Further, the fourth ball bearing 108 is closer to the first input end 52 than the second ball bearing 94 and the third ball bearing 102. The third ball bearing 102 is closer to the second input end 54 than the second ball bearing 94 and the fourth ball bearing 108. The third ball bearing 102 is axially disposed between the second ball bearing 94 and the fourth ball bearing 108. Moreover, the third ball bearing 102 is operatively coupled between the first and planetary gear sets 34, 36.

When the second internal ring gear 92 is subjected to a force in the second axial direction X2, the force is transferred from the second ball bearing 94 to the fourth ball bearing 108 through the second internal ring gear 92, the hub 104, the third ball bearing 102, web 112, the first internal ring gear 80, the first external ring gear 84, and the ring support 114. Because the fourth ball bearing 108 is fixed to the stationary member 28 along the second axial direction X, the second internal ring gear 92 remains constrained or substantially stationary relative to the stationary member 28 along the second axial direction X when the second internal ring gear 92 is subjected to a force in the second axial direction X2. Therefore, the second ball bearing 94, the third ball bearing 102, and the fourth ball bearing 108 jointly fix the second internal ring gear 92 along the second axial direction X2. Further, the second ball bearing 94, the third ball bearing 102, and the fourth ball bearing 108 also jointly fix the second internal ring gear 92 along the first axial direction X1. Specifically, when the second internal ring gear 92 is subjected to a force in the first axial direction X1, force is transferred from the fourth ball bearing 108 to the second ball bearing 94 through ring support 114, the first external ring gear 84, the first internal ring gear 80, the web 112, the third ball bearing 102, the hub 104, and the second internal ring gear 92. Because the second ball bearing 94 is fixed to the stationary member 28 in the first axial direction X1, the second internal ring gear 92 remains constrained or substantially stationary relative to the stationary member 28 along the first axial direction X1 when the second internal ring gear 92 is subjected to a force in the first axial direction X1. Thus, the second ball bearing 94, the third ball bearing 102, and the fourth ball bearing 108 jointly fix the second internal ring gear 92 along the first axial direction X1.

The second fixed, free bearing arrangement 82 also includes the second roller bearing 106, which only supports radial loads acting on the input member 26 along the radial direction R (or any other member of the EVT 20 supported by the second fixed, free bearing arrangement 82). The second roller bearing 106 may be a needle roller bearing and is disposed between the input member 26 and the hub 104. Moreover, the second roller bearing 106 is coaxially arranged relative to the input member 26 and can be in direct contact with the input member 26 and the hub 104. The second roller bearing 106 is disposed around the input member 26 and is not fixed to the stationary member 28 along the first and second axial directions X1, X2. Rather, the second roller bearing 106 supports the input member 26 only along the radial direction R.

The EVT 20 additionally includes a third fixed, free bearing arrangement 116 for supporting the first rotor shaft 40. In the depicted embodiment, the third fixed, free bearing arrangement 116 includes a fifth ball bearing 118 fixed to the stationary member 28 in the first axial direction X1, second axial direction X2, and radial direction R. Accordingly, the fifth ball bearing 118 remains constrained or substantially stationary relative to the stationary member 28 along first axial direction X1, second axial direction X2, and radial direction R. As a non-limiting example, snap rings 70 may be fixed to the stationary member 28 to fix the fifth ball bearing along the first and second axial direction X1, X2. The stationary member 28 may directly contact the fifth ball bearing 118 in order to fix the fifth ball bearing 118 along the radial direction R. The fifth ball bearing 118 may be coaxially arranged relative to the first rotor shaft 40 and may be in direct contact with the stationary member 28 and the first rotor shaft 40. Further, the fifth ball bearing 118 is disposed around the first rotor shaft 40 and supports axial and radial loads on the first rotor shaft 40.

The third fixed, free bearing arrangement 116 further includes a third roller bearing 120 (e.g., needle roller bearing) supporting the first rotor shaft 40. Specifically, the third roller bearing 120 is disposed around the first rotor shaft 40 and only supports radial loads on the first rotor shaft 40. In the depicted embodiment, the third roller bearing 120 is spaced apart from the fifth ball bearing 118 along the second axial direction X. Further, the third roller bearing 120 may be in direct contact with the first rotor shaft 40 and the center support 98 of the stationary member 28. As a consequence, the third roller bearing 120 is fixed to the stationary member 28 only along the radial direction R. As such, the third roller bearing 120 remains constrained or substantially stationary relative to the stationary member 28 only along the radial direction R. In summary, the first, second, and third fixed, free bearing arrangements 56, 82, 116 in the EVT 20 help minimize mechanical losses by minimizing the effective mean diameters of the bearings 19.

At least some of the bearings 19 of the EVT 20 described above (e.g., the first ball bearing 58) are arranged in a nested or staggered configuration in order to minimize the length of the electro-mechanical drive system 16. In the depicted embodiment, the first ball bearing 58 is substantially aligned with the fourth ball bearing 108 along a third axis C in order to minimize the length of the electro-mechanical drive system 16. The third axis C is perpendicular to the first axis A. Thus, the third axis C is perpendicular to the input member 26 (e.g., main shaft 27). The third ball bearing 102 is substantially aligned with the second roller bearing 106 along a fourth axis D in order to minimize the length of the electro-mechanical drive system 16. The fourth axis D is perpendicular to the first axis A. Thus, the fourth axis D is perpendicular to the input member 26 (e.g., main shaft 27). The second ball bearing 94 is substantially aligned with the third roller bearing 120 along a fifth axis E in order to minimize the length of the electro-mechanical drive system 16. The fifth axis E is perpendicular to the first axis A. Therefore, the fifth axis E is perpendicular to the input member 26 (e.g., main shaft 27).

With reference to FIG. 3, the transfer gear set 46 extends along a second axis B and is operatively coupled to the compound planetary gear arrangement 32 (FIG. 1). The transfer gear set 46 includes a transfer shaft 122 extending along the second axis B. The second axis B is offset but parallel to the first axis A. The transfer shaft 122 can rotate about the second axis B and defines a first shaft end 123 and a second shaft end 125 opposite the first shaft end 123. In addition to the transfer shaft 122, the transfer gear set 46 includes a first transfer gear 124, a second transfer gear 126, and a third transfer gear 128 spaced apart from one another along the second axis B. Each of the first transfer gear 124, second transfer gear 126, and third transfer gear 128 can rotate about the second axis B and is disposed round the transfer shaft 122. The first transfer gear 124 is operatively coupled to the second motor 48. Specifically, the first transfer gear 124 is operatively coupled to the second motor 48 such that rotation of the second rotor shaft 50 causes first transfer gear 124 to rotate about the second axis B. In the depicted embodiment, a motor gear 130 is attached to the second rotor shaft 50. Consequently, the rotation of the second rotor shaft 50 causes the motor gear 130 to rotate about a sixth axis F. The second rotor shaft 50 extends along the sixth axis F. The sixth axis F is parallel to the second axis B and the first axis A. The motor gear 130 meshes with the first transfer gear 124. Accordingly, the rotation of the motor gear 130 about the sixth axis F causes the first transfer gear 124 to rotate about the second axis B. In turn, the first transfer gear 124 meshes with the first external ring gear 84 and, consequently, the rotation of the first transfer gear 124 about the second axis B causes the first external ring gear 84 to rotate about the first axis A (FIG. 2). The first transfer gear 124 is not rotatably coupled to the transfer shaft 122. As such, the transfer shaft 122 can rotate independently of the first transfer gear 124.

The third transfer gear 128 is operatively coupled to the second external ring gear 96 such that torque can be transmitted between the second external ring gear 96 and the transfer gear 128. Specifically, the third transfer gear 128 meshes with the second external ring gear 96. As a result, the rotation of the second external ring gear 96 about the first axis A (FIG. 2) causes the third transfer gear 128 to rotate bout the second axis B. Further, the third transfer gear 128 is rotatably coupled to the transfer shaft 122. Therefore, the rotation of the third transfer gear 128 about the second axis B causes the transfer shaft 122 to rotate about the second axis B. Moreover, the rotation of the transfer shaft 122 about the second axis B causes the second transfer gear 126 to rotate about the second axis B.

The second transfer gear 126 is operatively coupled to the differential 22 (FIG. 1). As such, torque can be transmitted from the second transfer gear 126 to the differential 22. In particular, the second transfer gear 126 meshes with the differential ring gear 24, thereby allowing torque to be transmitted from the second transfer gear 12 to the differential ring gear 24.

The electro-mechanical drive system 16 further includes a fourth fixed, free bearing arrangement 132 for supporting the transfer shaft 122. The fourth fixed, free bearing arrangement 132 supports axial and radial loads acting on the transfer shaft 122 (or any other member of the EVT 20 supported by the fourth fixed, free bearing arrangement 132) and helps minimize mechanical losses in the electro-mechanical drive system 16. In the depicted embodiment, the fourth fixed, free bearing arrangement 132 includes a sixth ball bearing 134 disposed around the third transfer gear 128 and the transfer shaft 122. The sixth ball bearing 134 is closer to the second shaft end 125 than to the first shaft end 123. The center support 98 of the stationary member 28 contacts the sixth ball bearing 134, thereby fixing the sixth ball bearing 134 to the stationary member 28 along the first axial direction X1, the second axial direction X2, and the radial direction R. Accordingly, the sixth ball bearing 134 remains constrained or substantially stationary relative to the stationary member 28 (e.g., case) in the first axial direction X1, the second axial direction X2, and the radial direction R.

The fourth fixed, free bearing arrangement 132 further includes a fourth roller bearing 136 disposed around the transfer shaft 122. The fourth roller bearing 134 supports radial loads on the transfer shaft 122 and is closer to the first shaft end 123 than the second shaft end 125. Moreover, the fourth roller bearing 134 only supports the transfer shaft 122 along the radial direction R. To do so, the fourth roller bearing 134 is fixed to the stationary member 28 along the radial direction R. Accordingly, the fourth roller bearing 134 remains constrained or substantially stationary relative to the stationary member 28 along the radial direction R. Thus, the fourth roller bearing 134 only supports radial loads on the transfer shaft 122.

Some of the bearings supporting the transfer shaft 122 are arranged in a nested or staggered configuration in order to minimize the length of the electro-mechanical drive system 16. The EVT 20 includes a seventh ball bearing 138 overlapping the fourth roller bearing 136 along the radial direction R. The seventh ball bearing 138 supports the transfer shaft 122 and is disposed around the transfer shaft 122. In particular, the seventh ball bearing 138 overlaps the fourth roller bearing 136 along the radial direction R such a seventh axis G, which is perpendicular to the first and second axes A, B, intersects the fourth roller bearing 136 and the seventh ball bearing 138. The seventh ball bearing 138 is aligned with the fourth ball bearing 108 along the third axis C.

The stationary member 28 (e.g., case 30) entirely or partly encases the compound planetary gear arrangement 32, the first electric motor-generator 38, the second electric motor-generator 48, the transfer gear set 46, the plurality of ball bearings 11 (e.g., deep groove ball bearings), and the plurality of roller bearings 13 (needle roller bearings).

Figure 4:
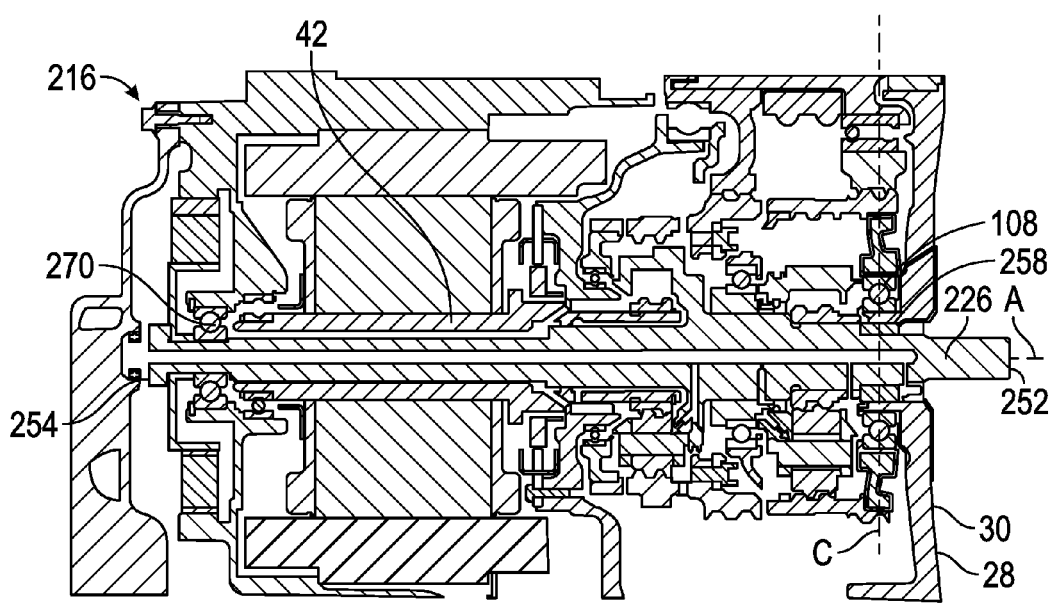
FIG. 4 is schematic, side, sectional view of an electro-mechanical drive system in accordance with another embodiment of the present disclosure.

FIG. 4 schematically illustrates an electro-mechanical drive system 216 in accordance with another embodiment of the present disclosure. The structure and operation of the electro-mechanical drive system 216 is substantially similar or identical to the electro-mechanical drive system 16, except for the features described below. In this embodiment, the electro-mechanical drive system 216 does not include the input extension member 42 (FIG. 2). Rather, the input member 226 extends all the way through the first rotor shaft 40 along the first axis A. In the depicted embodiment, the input member 226 (e.g., main shaft 27) is a one-piece structure and defines a first input end 252 and a second input end 254 opposite the first input end 252. The second input end 252 is disposed outside the first electric motor-generator 38.

With continued reference to FIG. 4, electro-mechanical drive system 16 further includes a fifth roller bearing 258 and an eighth ball bearing 270 supporting the input member 226. The fifth roller bearing 258 replaces the first ball bearing 58 (FIG. 2) and is disposed in the same location as the first ball bearing 58. Because the first ball bearing 58 is replaced with the fifth roller bearing 258, the fourth ball bearing 108 of the electro-mechanical drive system 216 has a smaller mean diameter than the fourth ball bearing of the electro-mechanical drive system 16. In this embodiment, the fourth ball bearing 108 is substantially aligned with the fifth roller bearing 258 along the third axis C. The fifth roller bearing 258 can support only radial loads on the input member 26 (e.g., main shaft 27) and is closer to the first input end 252 than the eighth ball bearing 270.

The eighth ball bearing 270 is closer to the second input end 254 than the fifth roller bearing 258. Further, the eighth ball bearing 270 is fixed to the stationary member 28 along the first axial direction X1, the second axial direction X2, and the radial direction R. Accordingly, the eighth ball bearing 270 remains constrained or substantially stationary relative to the stationary member 28 along the first axial direction X1, the second axial direction X2, and the radial direction R. To do so, the electro-mechanical drive system 216 may include a sock nut 272 (or any other suitable fastener) coupling the eighth ball bearing 270 to the stationary member 28.

While the best modes for carrying out the invention have been described in detail, those familiar with the art to which this invention relates will recognize various alternative designs and embodiments for practicing the invention within the scope of the appended claims.

The invention claimed is:

1. An electro-mechanical drive system, comprising:
a stationary member;
an input member extending along an input axis;
a compound planetary gear arrangement operatively coupled to the input member such that torque is transmitted from the input member to the compound planetary gear arrangement;
a first electric motor-generator operatively coupled to the compound planetary gear arrangement such that torque is transmitted between the first electric motor-generator and the compound planetary gear arrangement, wherein the first electric motor-generator includes a first rotor shaft extending along the input axis;
a second electric motor-generator operatively coupled to the compound planetary gear arrangement such that torque is transmitted between the second electric motor-generator and the compound planetary gear arrangement, wherein the second electric motor-generator includes a second rotor shaft extending along a rotor axis, the rotor axis is parallel to the input axis, the rotor axis is spaced apart from the input axis along a radial direction, the radial direction is perpendicular to an axial direction, and the rotor axis and the input axis are parallel to the axial direction;
a transfer gear set extending along a transfer gear axis, wherein the transfer gear set is operatively coupled between the second electric motor-generator and the compound planetary gear arrangement such that torque is transmitted between the second electric motor-generator and the compound planetary gear arrangement through the transfer gear set;
a plurality of bearings including:
a ball bearing supporting the input member, wherein the ball bearing is fixed to the stationary member such that the ball bearing remains constrained relative to the stationary member;
a roller bearing supporting the input member;
wherein at least two of the plurality of bearings are aligned with each along a bearing axis, and the bearing axis is perpendicular to the input axis; and
wherein the transfer gear axis is spaced apart from the input axis along the radial direction.

2. The electro-mechanical drive system of claim 1, wherein the ball bearing is a first ball bearing, the input axis is a first axis, the transfer gear axis is a second axis, the bearing axis is a third axis, the axial direction is a first axial direction, and the plurality of bearings further comprise a second, third, and fourth ball bearings disposed around the input member such that the second, third and fourth ball bearings jointly support axial and radial loads on the input member along the first axial direction, a second axial direction opposite the first axial direction, and the radial direction, and the radial direction is perpendicular to the second axial direction.

3. The electro-mechanical drive system of claim 2, wherein the roller bearing is a first roller bearing, and the the plurality of bearings further comprise a second roller bearing disposed around the input member such that the second roller bearing supports radial loads on the input member.

4. The electro-mechanical drive system of claim 3, wherein the plurality of bearings further comprise a fifth ball bearing disposed around the first rotor shaft such that the fifth ball bearing supports axial and radial loads on the first rotor shaft.

5. The electro-mechanical drive system of claim 4, wherein the fifth ball bearing is fixed to the stationary member such that the fifth ball bearing remains constrained relative to the stationary member along the first axial direction, the second axial direction, and the radial direction.

6. The electro-mechanical drive system of claim 5, wherein the plurality of bearings further comprise a third roller bearing disposed around the rotor shaft such that the third roller bearing supports radial loads on the first rotor shaft.

7. The electro-mechanical drive system of claim 6, wherein the first ball bearing is aligned with the fourth ball bearing along the third axis.

8. The electro-mechanical drive system of claim 7, wherein the second roller bearing is aligned with the third ball bearing along a fourth axis, and the fourth axis is perpendicular to the first axis.

9. The electro-mechanical drive system of claim 8, wherein the second ball bearing is aligned with the third roller bearing along a fifth axis, and the fifth axis is perpendicular to the first axis.

10. The electro-mechanical drive system of claim 9, wherein the transfer gear set includes a transfer shaft extending along the second axis, and the the plurality of bearings further include a fourth roller bearing disposed around the transfer shaft such that the fourth roller bearing supports radial loads on the transfer shaft.

11. The electro-mechanical drive system of claim 10, wherein the plurality of bearings further include a sixth ball bearing disposed around the transfer shaft, and the sixth ball bearing is fixed to the stationary member such that the sixth ball bearing remains constrained relative to the stationary member along the first axial direction, the second axial direction, and the radial direction.

12. The electro-mechanical drive system of claim 11, wherein the rotor axis is a sixth axis, the sixth axis is parallel to the first and second axes.

13. The electro-mechanical drive system of claim 12, wherein the plurality of bearings further comprise a seventh ball bearing disposed around the transfer shaft.

14. The electro-mechanical drive system of claim 13, wherein the seventh ball bearing is aligned with the fourth ball bearing along the third axis.

15. The electro-mechanical drive system of claim 13, wherein the seventh ball bearing overlaps the fourth roller bearing along the radial direction such that a seventh axis intersects the fourth roller bearing and the seventh ball bearing, and the seventh axis is perpendicular to the first axis.

16. An electro-mechanical drive system, comprising:
a stationary member;
an input member extending along a first axis;
a compound planetary gear arrangement operatively coupled to the input member such that torque is transmitted from the input member to the compound planetary gear arrangement;
a first electric motor-generator operatively coupled to the compound planetary gear arrangement such that torque is transmitted between the first electric motor-generator and the compound planetary gear arrangement, wherein the first electric motor-generator includes a first rotor shaft extending along the first axis;
a second electric motor-generator operatively coupled to the compound planetary gear arrangement such that torque is transmitted between the second electric motor-generator and the compound planetary gear arrangement, wherein the second electric motor-generator includes a second rotor shaft;
a transfer gear set extending along a second axis, wherein the transfer gear set is operatively coupled between the second electric motor-generator and the compound planetary gear arrangement such that torque is transmitted between the second electric motor-generator and the compound planetary gear arrangement through the transfer gear set, wherein the transfer gear set includes a transfer shaft extending along the second axis;
a plurality of bearings, wherein at least two of the plurality of bearings are aligned with each other along a third axis, and the third axis is perpendicular to the first axis, and the plurality of bearings includes:
 a first ball bearing supporting the input member, wherein the first ball bearing is fixed to the stationary member such that the first ball bearing remains constrained relative to the stationary member;
 a second, third, and fourth ball bearings disposed around the input member such that the second, third and fourth ball bearings jointly support axial and radial loads on the input member along a first axial direction, a second axial direction opposite the first axial direction, and a radial direction perpendicular to the first and second axial directions, wherein the first ball bearing is aligned with the fourth ball bearing along the third axis;
 a fifth ball bearing disposed around the first rotor shaft such that the fifth ball bearing supports axial and radial loads on the first rotor shaft, wherein the fifth ball bearing is fixed to the stationary member such that the fifth ball bearing remains constrained relative to the stationary member along the first axial direction, the second axial direction, and the radial direction;
 a sixth ball bearing disposed around the transfer shaft, wherein the sixth ball bearing is fixed to the stationary member such that the sixth ball bearing remains constrained relative to the stationary member along the first axial direction, the second axial direction, and the radial direction;
 a seventh ball bearing disposed around the transfer shaft, wherein the seventh ball bearing is aligned with the fourth ball bearing along the third axis;
 a first roller bearing supporting the input member;
 a second roller bearing disposed around the input member such that the second roller bearing supports radial loads on the input member, wherein the second roller bearing is aligned with the third ball bearing along a fourth axis, and the fourth axis is perpendicular to the first axis;
 a third roller bearing disposed around the first rotor shaft such that the third roller bearing supports radial loads on the first rotor shaft, wherein the second ball bearing is aligned with the third roller bearing along a fifth axis, and the fifth axis is perpendicular to the first axis; and
 a fourth roller bearing disposed around the transfer shaft such that the fourth roller bearing supports radial loads on the transfer shaft; and
wherein the second rotor shaft extending along a sixth axis, and the sixth axis is parallel to the first and second axes.

17. An electro-mechanical drive system, comprising:
a stationary member;
an input member extending along a first axis;

a compound planetary gear arrangement operatively coupled to the input member such that torque is transmitted from the input member to the compound planetary gear arrangement;

a first electric motor-generator operatively coupled to the compound planetary gear arrangement such that torque is transmitted between the first electric motor-generator and the compound planetary gear arrangement, wherein the first electric motor-generator includes a first rotor shaft extending along the first axis;

a second electric motor-generator operatively coupled to the compound planetary gear arrangement such that torque is transmitted between the second electric motor-generator and the compound planetary gear arrangement, wherein the second electric motor-generator includes a second rotor shaft;

a transfer gear set extending along a second axis, wherein the transfer gear set is operatively coupled between the second electric motor-generator and the compound planetary gear arrangement such that torque is transmitted between the second electric motor-generator and the compound planetary gear arrangement through the transfer gear set, and the transfer gear set includes a transfer shaft extending along the second axis;

a plurality of bearings, wherein at least two of the plurality of bearings are aligned with each other along a third axis, and the third axis is perpendicular to the first axis, and the plurality of bearings includes:
  a first ball bearing supporting the input member, wherein the first ball bearing is fixed to the stationary member such that the first ball bearing remains constrained relative to the stationary member;
  a second, third, and fourth ball bearings disposed around the input member such that the second, third and fourth ball bearings jointly support axial and radial loads on the input member along a first axial direction, a second axial direction opposite the first axial direction, and a radial direction perpendicular to the first and second axial directions, wherein the first ball bearing is aligned with the fourth ball bearing along the third axis;
  a fifth ball bearing disposed around the first rotor shaft such that the fifth ball bearing supports axial and radial loads on the first rotor shaft, wherein the fifth ball bearing is fixed to the stationary member such that the fifth ball bearing remains constrained relative to the stationary member along the first axial direction, the second axial direction, and the radial direction;
  a sixth ball bearing disposed around the transfer shaft, wherein the sixth ball bearing is fixed to the stationary member such that the sixth ball bearing remains constrained relative to the stationary member along the first axial direction, the second axial direction, and the radial direction;
  a seventh ball bearing disposed around the transfer shaft;
  a first roller bearing supporting the input member;
  a second roller bearing disposed around the input member such that the second roller bearing supports radial loads on the input member, wherein the second roller bearing is aligned with the third ball bearing along a fourth axis, and the fourth axis is perpendicular to the first axis;
  a third roller bearing disposed around the first rotor shaft such that the third roller bearing supports radial loads on the first rotor shaft, wherein the second ball bearing is aligned with the third roller bearing along a fifth axis, and the fifth axis is perpendicular to the first axis; and
  a fourth roller bearing disposed around the transfer shaft such that the fourth roller bearing supports radial loads on the transfer shaft; and wherein the second rotor shaft extending along a sixth axis, and the sixth axis is parallel to the first and second axes, and the seventh ball bearing overlaps the fourth roller bearing along the radial direction such that a seventh axis intersects the fourth roller bearing and the seventh ball bearing, and the seventh axis is perpendicular to the first axis.

* * * * *